United States Patent
McKinnon et al.

[15] 3,690,339
[45] Sept. 12, 1972

[54] FLUIDIC POSITION SENSOR
[72] Inventors: Murdoch G. McKinnon; James N. Wilson; Robert W. Besant, all of Saskatoon, Saskatchewan, Canada
[73] Assignee: Atomic Energy of Canada Limited, Ottawa, Ontario, Canada
[22] Filed: Oct. 24, 1969
[21] Appl. No.: 869,315

[52] U.S. Cl. .................................. 137/81.5, 73/37
[51] Int. Cl. .......................... F15c 1/08, F15c 4/00
[58] Field of Search .................................. 137/81.5

[56] References Cited

UNITED STATES PATENTS

| 3,204,652 | 9/1965 | Bauer | 137/81.5 |
| 3,232,095 | 2/1966 | Symmoski et al. | 137/81.5 X |
| 3,282,280 | 11/1966 | Horton | 137/81.5 |
| 3,331,380 | 7/1967 | Schonfeld et al. | 137/81.5 |
| 3,467,122 | 9/1969 | Jones | 137/81.5 |
| 3,489,009 | 1/1970 | Rimmer | 137/81.5 X |
| 3,542,050 | 11/1970 | Sowers | 137/81.5 |
| 3,556,120 | 1/1971 | Bauer | 137/81.5 |

Primary Examiner—Samuel Scott
Attorney—James R. Hughes

[57] ABSTRACT

A position sensing apparatus, particularly suitable for sensing the level of a liquid, comprising a tubular member disposed within the liquid to be measured, and a fluidic element having a fluid supply and a first and second outlet. The first outlet is pressure load sensitive and is connected to the tubular member. The fluidic element may be a monostable or bistable wall attachment amplifier or logic device which switches in response to pressure waves and expansion waves reflected from the liquid surface within the tubular member, and oscillates at a rate dependent on the level of the liquid. The frequency or period of oscillation is converted to a measure of the level of the liquid. The apparatus may also be used to sense the position of a piston in a tube.

1 Claim, 8 Drawing Figures

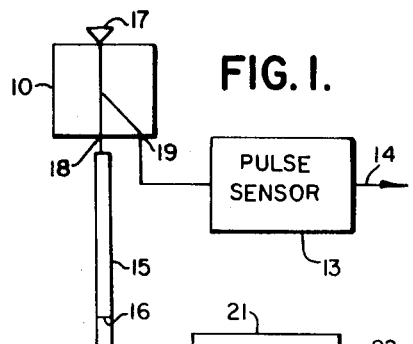
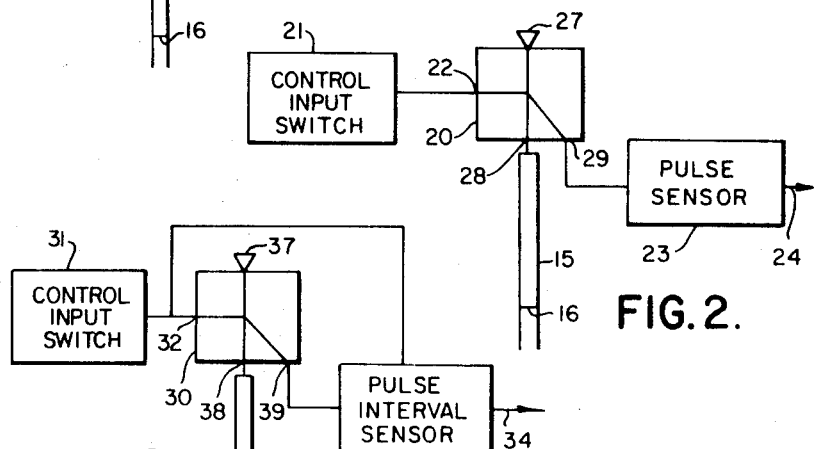
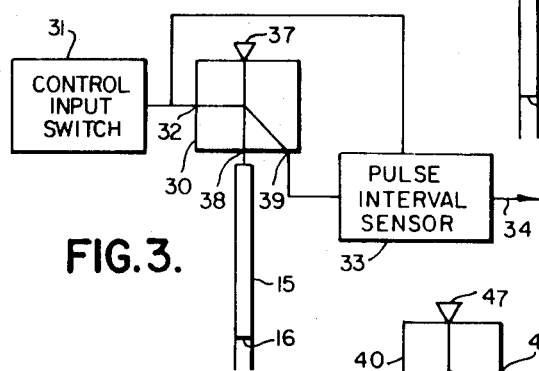
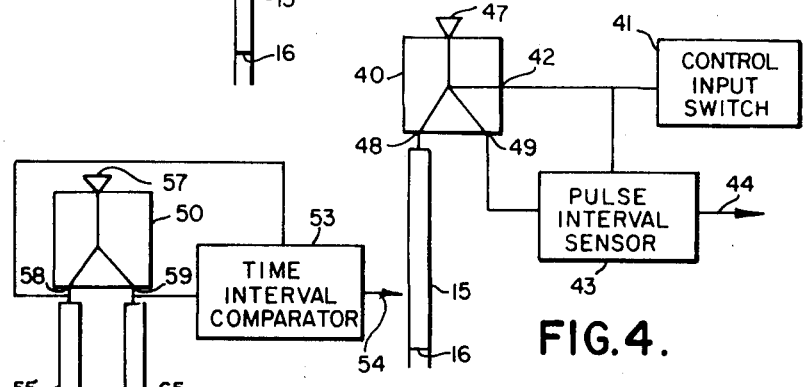
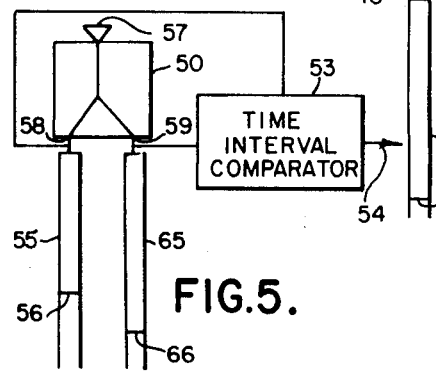

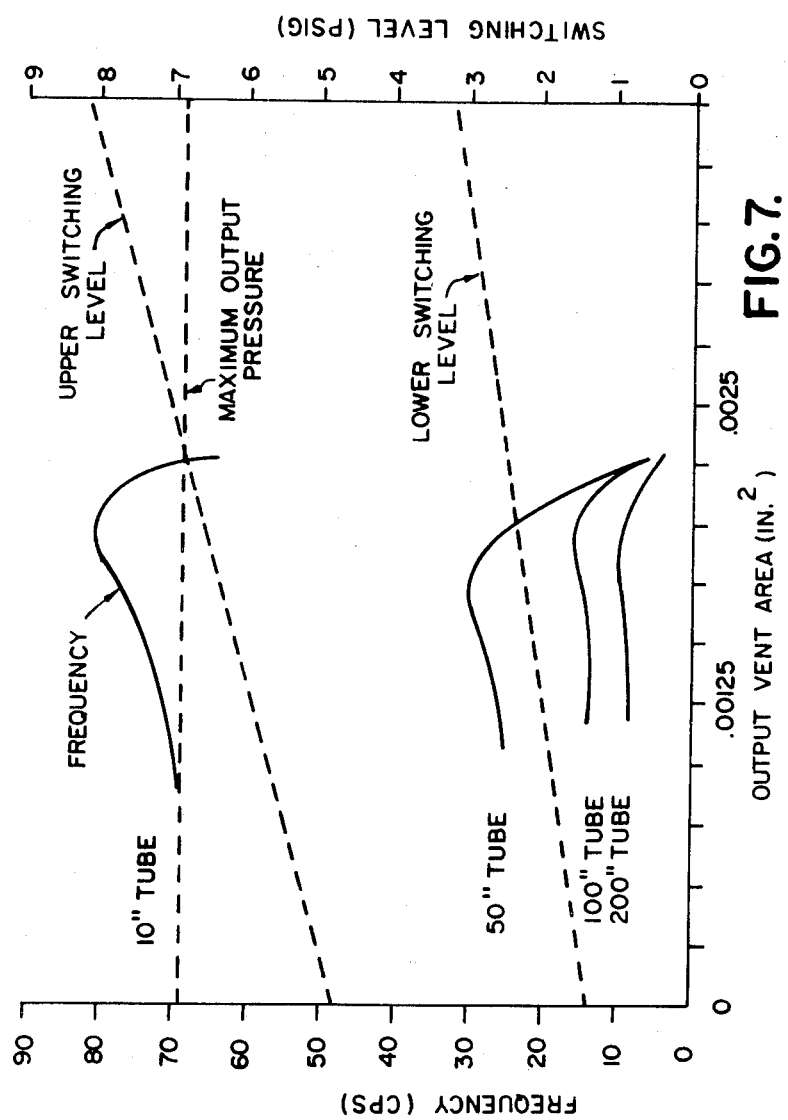

FLUIDIC POSITION SENSOR

This invention relates to a fluidic position sensor.

In recent years, rapid progress has been made in the field of fluidic control systems. Complex, cheap and reliable systems, composed of fluid state devices, have been found to be suitable for roles in a wide variety of engineering fields, most notably those of nuclear, space, medical and industrial. However, the lack of adequate sensing elements has caused some of the advantages of fluidic systems to be lost. If electrical or mechanical sensors are used in a fluidic system, the entire system has the limitations of both kinds of elements. Hence, there is a need for sensing elements which use a fluid as an operating medium and have no moving mechanical parts.

It is an object of the present invention to provide a fluid operated device for sensing position. The invention is ideally suited for sensing the level of a liquid or the position of a piston in a tube. The device is simple, the components are cheap and it operates in a digital mode which complies with the general trend in large control systems. The sensor has other potential applications such as in analog to digital conversion.

More generally, the invention can be used for sensing any variable which can be transduced to a mechanical displacement. For example, the device could be used to sense the level of mercury in a thermometer column, thereby sensing temperature.

In nuclear engineering applications fluidic systems have several distinct advantages over electronic systems. Their reliability and useful lifetime is not greatly affected by radiation. Also, fluidic devices are cheap and can operate on the fluid media already present in the reactor.

The invention will now be described by way of example, with reference to the accompanying drawings in which:

FIGS. 1 to 5 inclusive are schematic diagrams showing five embodiments of the invention;

FIG. 7 is a graph showing how frequency for various tube length, and switching levels vary with output vent area;

Figure 6:
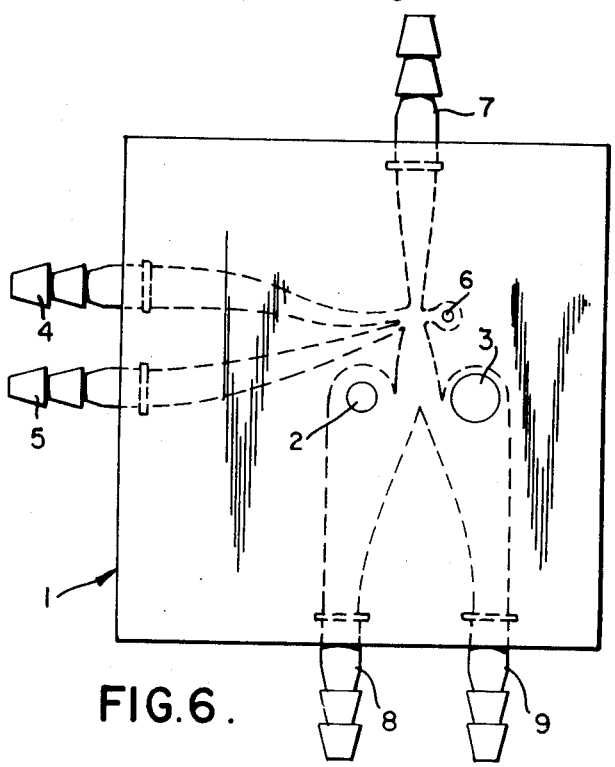
FIG. 6 is a plan view of one fluidic element.

The invention is a position sensing apparatus comprising; a tubular member having passage blocking means which may for example be a tube positioned in a liquid for measuring the level of the liquid, a fluidic wall attachment element having a fluid supply inlet, a first load pressure sensitive outlet and a second outlet, wherein the first outlet is connected to the tubular member, and having means for initiating at least one cycle of oscillation between the first and second outlets, wherein the period or frequency of oscillation is determined by the length of the tubular member from the first outlet to the blocking means, and including means responsive to the period or frequency of oscillation to provide an indication of the position of the blocking means.

The fluidic element may be a monostable fluidic element having means for biasing the fluid supply towards the first load pressure sensitive outlet, or a bistable fluidic element having a control port, an input to which initiates a cycle of oscillation.

The apparatus may include two tubular members each having blocking means and each being connected to a fluidic element having two pressure load sensitive outlets, wherein the time interval the fluidic supply remains switched to each of the outlets is determined by the position of the respective blocking means. Means for comparing the difference of time intervals provide an indication of the relative position of the blocking means.

The embodiments using a monostable fluidic element preferably includes a control port, an input to which normally prevents oscillation and further includes means for removing the input to the control input so that the oscillation cycle may proceed.

The apparatus includes venting means to allow the escape of fluid from the tubular member after the fluid supply is switched from the first outlet to the second outlet. The venting means may be in the form of a vortex vent disposed within the fluidic element.

The fluidic element preferably has the upper and lower switching levels chosen so that a pressure wave formed when the fluidic device switches from the second to the first outlet in turn causes switching back to said second outlet after its first reflection from the blocking means within the tubular member.

OPERATION

The operation of the sensing apparatus will be described with particular reference to FIG. 1 which shows the invention in its simplest form.

The position sensing apparatus includes a tubular member 15 having passage blocking means 16 which may for example be in the form of a tube 15 placed in a liquid wherein it is desired to measure the level of the liquid 16. The apparatus includes a fluidic wall attachment element 10 having a fluid supply inlet 17, a first load pressure sensitive outlet 18 and a second outlet 19. The first outlet is connected with the tubular member 15.

Each of the embodiments of FIGS. 1 to 5 have means for producing at least one cycle of oscillation between the first outlet 18 and the second outlet 19. In FIG. 1 the means for initiating oscillation is inherent in the fluidic element 10. The fluidic element is a monostable load pressure sensitive element biased towards the first outlet 18. Initially the fluid supply jet will flow into the first outlet 18 since the fluidic element is biased towards it. The fluid passes through the first outlet and into the blocked tubular member 15 wherein the pressure increases. Because the first outlet is load sensitive a pressure level will be quickly reached at which the fluid supply will be switched to the second outlet. The pressure level causing switching from the first to the second outlet will subsequently be referred to as the upper switching level. As soon as switching to the second outlet has taken place the pressure in the tubular member will be reduced as fluid escapes until a pressure level, the lower switching level, is reached at which the fluid supply switches back to the first outlet 18. The cycle is repeated and the frequency of oscillation varies inversely with the unblocked length of the tubular member.

Although the above description is convenient in describing how the cycle is begun it does not adequately describe the actual operation of the apparatus. When the fluid supply jet switches from the second outlet 19 to the first outlet 18, a pressure wave is formed which travels down the tubular member 15. Upon reaching the blocked end 16 it is reflected upwards. The pressure waves reverberate in the tubular member until the upper switching level is reached. In the same manner when the fluid supply switches from the first to the second outlet an expansion wave reverberates in the tubular chamber 15 until the lower switching level is reached. For optimum operation the switching levels must be chosen so that the fluid supply switches on the first reflection of the pressure wave and expansion wave over the required length of tubular member. In this way the effects of friction can be minimized since the effective length of the tube with respect to frictional effects depends on the distance the pressure waves must travel. A pressure wave which is reflected only once will travel a shorter distance than one which is reflected more than once.

In FIG. 1 the frequency of oscillation is determined by measuring the rate of pulses from the second outlet 19 by pulse sensor means 13. The pulse sensor means may for example be in the form of a pressure transducer or a fluidic amplifier.

The output 14 from the pulse sensor 13 may be used so as to provide a measure of the actual position of the blocking means 16 or to control a process in response to the position of the blocking means 16.

In FIGS. 2, 3, and 4 the means for initiating oscillations is provided by the control switch 21, 31, or 41 respectively.

If the level of a liquid is being measured, pressure pulses from the first outlet as a result of continuous oscillation as in FIG. 1 may affect the level of the liquid 16 in the tube 15. The arrangement of FIG. 2 provides that oscillation occurs only when the input to the control port 22 is absent and hence provides means for sampling of frequency so as to reduce the effects of continuous pressure pulses on the liquid level 16.

The embodiment of FIG. 3 operates in a manner similar to that of FIG. 2. Control input switch controls the input to control port 32. In the absence of an input to the control port 32 the supply fluid switches to the first outlet 38 and returns to the second outlet 39. Pulse interval sensor 33 measures the period of a cycle.

The arrangement of FIG. 4 uses a bistable fluidic element 40. An input to the control port 42 initiates an oscillation cycle for which the period is measured by pulse interval timer sensor 45.

FIG. 5 shows an embodiment using a bistable fluidic element 50 having two tubular members 55 and 65. The time interval during which the fluid supply remains switched to each outlet will be determined by the position of the blocking means 56 or 66 within the respective tubular members 55 or 65. The comparator 53 compares the time interval the fluid supply remains switched to each outlet 58 or 59 and thereby provides an indication of the relative position of the blocking means 56 and 66.

EXAMPLE

FIG. 6 shows a detailed example of a monostable fluidic element suitable for use in the present fluidic position sensor.

The fluidic element 1 is a modified epoxy cast version of the 1100M01 amplifier manufactured by Aviation Electric of Montreal. The regular 1100M01 amplifier as supplied by the manufacturer is not sensitive to pressure load and therefore is not suitable for the present purposes. The necessary pressure load sensitivity may be induced by reducing the size of the output vent 2. This was achieved by making casings of the manufacturer's amplifiers with the output vent 2 blocked and subsequently drilling a vent 2 of the desired size. The output vent 2 allows fluid under the pressure in the tubular member to escape, after the upper switching level is reached and the fluid supply switches from the first to the second outlet. Thus, the vent 2 allows the pressure at the first outlet to fall to that of the lower switching level. Some fluid, however, will flow from the tubular member through the fluidic element and out of the second outlet, particularly when the pressure in the tubular member is highest.

The tubular member is connected to the load pressure sensitive outlet 8. The fluid supply is introduced at inlet 7. The monostable amplifier 1 is biased towards the first outlet 8 by internal geometrical design and by means of the vent 6. For use in an arrangement as in FIG. 1 the control inputs 4 and 5 as shown in FIG. 6 may be left open. In the embodiments of FIG. 2, or FIG. 3, one of the control inputs 4 or 5 as shown in FIG. 6 may be used.

The size of the output vent 2 will determine the switching levels. As there may be considerable scatter of switching levels among individual fluidic elements it is best to determine switching levels experimentally. It has been found that the switching levels determined by static tests correspond to the switching levels that occur during oscillation. Thus, switching levels may be determined by static tests alone.

By judiciously choosing the size of the output vent, switching levels may be obtained which provide oscillation over a wide range of tube lengths.

The switching levels must, however, be measured under appropriate load conditions. When used as a sensing element, the pulses from the second outlet must be fed into some type of load. The load is a pulse sensor or a pulse interval sensor. The load may be in the form of a counter, the control part of an amplifier or a pressure transducer. It has been found that switching levels are affected only by very high impedance loads. The effects of load may be avoided by placing a fluidic diode between the second outlet and the load.

It was also found that the supply pressure at the supply inlet 7 may affect frequency of oscillation. When the supply pressure is below 10 psig the frequency of oscillation decreases as supply pressure increases. However, with the supply pressure above 10 psig, frequency becomes independent of pressure.

The upper switching level does not correspond with the lower switching level. A pressure differential exists between these two levels because of the effect of the reattachment vortex and the output vortex at the vent 2. To cause switching from the first to the second outlet, both of these vorticies must be broken down. As the fluid supply pressure is increased the upper and lower switching levels will also increase. The upper level increases at a greater rate than the lower level with the result that the two switching levels diverge as supply pressure increases. The switching levels also diverge with increasing area of the output vent 2. This relationship is shown graphically in FIG. 7.

The fluidic element will have a high pressure loss between supply inlet 7 and the outlet 8. The maximum output pressure is about 40 percent of the supply pressure. Unlike switching levels, the maximum output pressure is not noticeably affected by the characteristics of individual fluidic devices. However, the maximum output pressure is an important parameter in the design of load sensitive oscillators. Oscillations become erratic when the upper switching level is close to the maximum output pressure. Oscillation will not take place when the upper switching level is greater than the maximum output pressure, as is demonstrated by FIG. 7.

FIG. 7 shows various characteristics of the 1100M01 amplifier for different areas of the output vent 2 using air as the fluid. Also shown is the range of frequencies for various tube lengths. The supply pressure for the values shown was constant at 15 psig. The size of the tubular member was 0.125 in I.D. It will be seen the maximum size for the output vent 2 under the given conditions is approximately 0.00225 sq. in. Above this size the upper switching level approaches the maximum output pressure. The amplifier did operate at values below those shown, and in some cases operated when the output vent 2 was completely blocked. Generally, however, the operation becomes unpredictable when the vent area is below those shown.

Figure 8:
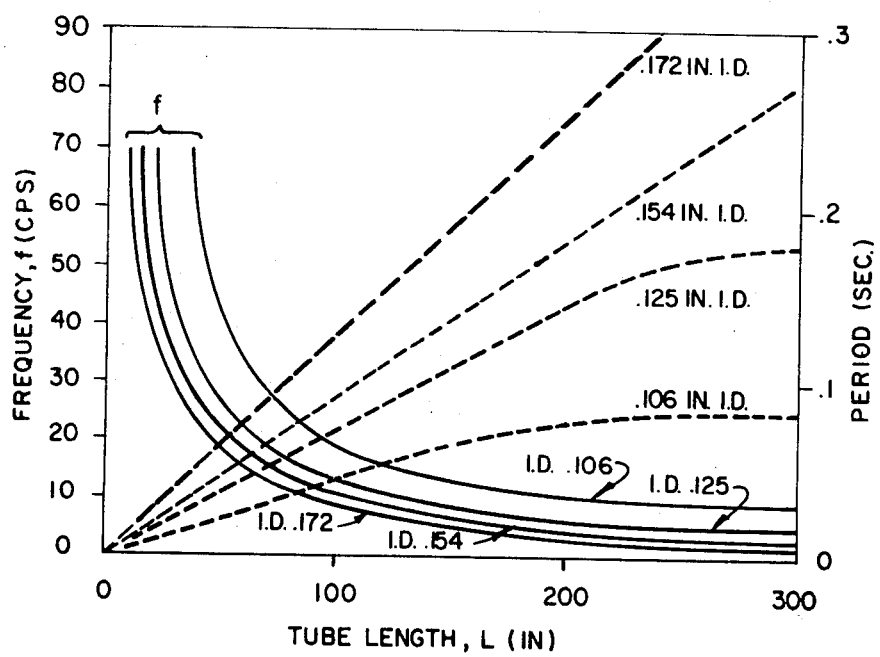
FIG. 8 is a graph showing frequency and period plotted against tube length.

FIG. 8 shows a plot of frequency and period (frequency$^{-1}$ against tube length for a number of tubular member sizes. Supply pressure was 15 psig. It can be seen that as the length of the tubular member increases the linearity with respect to period diminishes. Eventually a length will be reached whereat frequency becomes insensitive to tube length because of frictional effects on the pressure wave. The linear range with respect to period is extended by increasing the area of the tubular member. Sensitivity may be altered by changing the cross-sectional area of the tubular member in such a manner as to alter the shape of the output characteristic shown in FIG. 8. Another method of changing sensitivity when a liquid level is to be sensed, consists of coiling or spiraling the tube in the liquid.

The output vent 2 need not necessarily be in the form of a vortex vent as shown in FIG. 5. Any venting means may be used which allows for the release of pressure from the tubular member after switching of the fluid supply to the second outlet and at the same time maintains load pressure sensitivity.

Furthermore, the fluidic wall attachment element need not be an amplifier as described. It may be any type of fluidic logic device which has a load pressure sensitive outlet and a second outlet between which an oscillation cycle can be produced.

Although the means for detecting pressure pulses is preferably connected at the second outlet, it may if desired also be connected at the first outlet.

Although the invention described is particularly suitable for measuring the level of a liquid it will be understood that this invention is not to be limited thereto and may, for example, also be used to sense the position of a piston in a tubular member.

Also, this invention may be used to measure other variables indirectly, such as temperature or pressure, which can be sensed by measuring the level of a liquid or the position of a piston in a tube.

What is claimed:

1. A position sensing apparatus comprising:
   a. a first and second tubular member having first and second passage blocking means, respectively;
   b. a fluidic wall attachment element having a fluid supply inlet and first and second load pressure sensitive outlets, said first outlet being connected with said first tubular member and said second outlet being connected with said second tubular member, said fluid element having switching levels such that a pressure wave formed when the fluid supply switches from said second to said first outlet in turn causes switching back to said second outlet after reflection of the pressure wave from said blocking means within said first tubular member and a pressure wave formed when the fluid supply switches from said first to said second outlet in turn causes switching back to said first outlet after reflection of the pressure wave from said blocking means within said second tubular member, wherein the time interval that the fluid supply remains switched to the first outlet is determined by the length of said first tubular member from said first outlet to said first blocking means, and the time interval that the fluid supply remains switched to the second outlet is determined by the length of said second tubular member from said second outlet to said second blocking means; and
   c. means for comparing said time intervals wherein the difference of said time intervals provides an indication of the relative positions of said blocking means.

* * * * *